United States Patent
Allain Najman et al.

(10) Patent No.: US 12,304,823 B2
(45) Date of Patent: May 20, 2025

(54) PRECIPITATED SILICA AND PROCESS FOR ITS MANUFACTURE

(71) Applicant: RHODIA OPERATIONS, Paris (FR)

(72) Inventors: Emmanuelle Allain Najman, L'hay les Roses (FR); Cédric Feral-Martin, Emerainville (FR); Pascaline Garbey, Saint Didier Au Mont d'or (FR); Laurent Guy, Rillieux-la-Pape (FR); Sylvaine Neveu, Paris (FR); Caroline Fayolle, Lyons (FR)

(73) Assignee: RHODIA OPERATIONS, Paris (FR)

( * ) Notice: Subject to any disclaimer, the term of this patent is extended or adjusted under 35 U.S.C. 154(b) by 1096 days.

(21) Appl. No.: 17/111,206

(22) Filed: Dec. 3, 2020

(65) Prior Publication Data

US 2021/0087068 A1 Mar. 25, 2021

Related U.S. Application Data

(62) Division of application No. 16/611,171, filed as application No. PCT/EP2018/061310 on May 3, 2018.

(30) Foreign Application Priority Data

May 5, 2017 (EP) .................................. 17305512

(51) Int. Cl.
 *C01B 33/193* (2006.01)
(52) U.S. Cl.
 CPC ........ *C01B 33/193* (2013.01); *C01P 2006/12* (2013.01)

(58) Field of Classification Search
 CPC ..... C01B 33/00; C01B 33/128; C01B 33/193; C01B 33/12; C01B 33/26; C01B 33/2807; C01B 33/283; C01P 2006/12
 See application file for complete search history.

(56) References Cited

U.S. PATENT DOCUMENTS

| | | |
|---|---|---|
| 6,268,424 B1 | 7/2001 | Blume et al. |
| 2011/0178227 A1 | 7/2011 | Allain et al. |
| 2013/0178569 A1* | 7/2013 | Guy .......................... C08K 3/36 106/483 |
| 2015/0030518 A1 | 1/2015 | Allain et al. |
| 2015/0266742 A1 | 9/2015 | Clouin et al. |
| 2017/0073521 A1* | 3/2017 | Guy .......................... C08K 3/36 |

FOREIGN PATENT DOCUMENTS

| | | |
|---|---|---|
| EP | 0983966 B1 | 11/2001 |
| JP | 2011513189 A | 4/2011 |
| WO | 2009124829 A1 | 10/2009 |

OTHER PUBLICATIONS

Third Party Observation filed in European application No. EP20180720285 on Aug. 10, 2023 (7 pages).
Evonik Operations GmbH; Analytical Report filed on Aug. 10, 2023 (12 pages).

\* cited by examiner

*Primary Examiner* — Smita S Patel
(74) *Attorney, Agent, or Firm* — Osha Bergman Watanabe & Burton LLP

(57) ABSTRACT

A precipitated silica containing are least one element M selected from the group consisting of B, Al, Ga and mixtures thereof and characterized by the presence of specific acid sites on its surface and a process for its manufacture. Said precipitated silica is suitable for multiple applications, for instance as catalyst or catalyst support as well as reinforcing filler in polymeric compositions.

11 Claims, No Drawings

PRECIPITATED SILICA AND PROCESS FOR ITS MANUFACTURE

This application is a divisional application of U.S. application Ser. No. 16/611,171, which is a U.S. national stage entry under 35 U.S.C. § 371 of International Application No. PCT/EP2018/061310 filed May 3, 2018, which claims priority to European application No. EP 17305512.0 filed on May 5, 2017, the whole content of these applications being incorporated herein by reference for all purposes.

TECHNICAL FIELD

The present invention relates to precipitated silica and to a process for its manufacture.

BACKGROUND ART

The use of precipitated silica as a reinforcing filler in polymeric compositions, as catalyst support, as anticaking agent, as rheology modifier or abrasive in toothpaste compositions is known.

In particular there's always the need of precipitated silica which can be successfully used in multiple applications such as reinforcing filler in polymeric compositions and catalyst or catalyst support.

SUMMARY OF INVENTION

A first object of the present invention is to provide a novel precipitated silica which can be used in multiple applications, for instance as a catalyst or catalyst support as well as reinforcing filler in polymeric compositions. A second object of the invention is a process for the manufacture of the precipitated silica of the first object.

The inventive precipitated silica is characterised, among alia, by the presence of specific acid sites on its surface. The inventive silica is defined in detail in the description which follows and in the claims and the examples.

DESCRIPTION OF INVENTION

The precipitated silica of the invention is characterised by:
- an amount of at least one element M selected from the group consisting of B, Al, Ga and mixtures thereof in the range from 0.5 to 30.0 mol %;
- an infrared absorption spectrum having at least one peak between 1538 and 1559 $cm^{-1}$ and at least one peak between 1612 and 1635 $cm^{-1}$, said spectrum having been measured after chemisorption with pyridine to saturation followed by treatment under vacuum at 25° C., wherein the ratio (area under the peak between 1538 and 1559 $cm^{-1}$)/(the area under the peak between 1612 and 1635 $cm^{-1}$) is less than 0.80.

The use of pyridine adsorption for studying the nature of silica surfaces by means of infrared techniques has been previously described, see for instance Nikiel, L.; Zerda, T.; *J. Phys. Chem.*, 1991, 95, 4063 and Zaho, X. S. et al.; *J. Phys. Chem. B*, 1997, 101, 6525. The technique allows distinguishing between different SiOH sites in the silica structure.

Precipitated silica containing aluminium has been previously described, for instance in WO2015/128404 A1 and in WO2011/117400 A1. The infrared spectrum of the precipitated silica disclosed in these prior art documents, measured after chemisorption with pyridine to saturation followed by treatment under vacuum at 25° C., does not exhibit any peak between 1538 and 1559 $cm^{-1}$.

Advantageously, the precipitated silica of the invention is characterised by:
- an amount of at least one element M selected from the group consisting of B, Al, Ga and mixtures thereof in the range from 0.5 to 30.0 mol %;
- an infrared absorption spectrum having at least one peak between 1538 and 1559 $cm^{-1}$ and at least one peak between 1612 and 1635 $cm^{-1}$, said spectrum having been measured after chemisorption with pyridine to saturation followed by treatment under vacuum at 25° C.; and wherein the area under the peak between 1538 and 1559 $cm^{-1}$ is at least 0.02 $cm^{-1}$ and the ratio (area under the peak between 1538 and 1559 $cm^{-1}$)/(the area under the peak between 1612 and 1635 $cm^{-1}$) is less than 0.80.

In the present specification, the terms "silica" and "precipitated silica" are used as synonyms.

The inventive silica contains at least one element M selected from the group consisting of group B, Al, Ga and mixtures thereof. The at least one element M is present in an amount in the range from 0.5 to 30.0 mol %. Throughout the present text the amount of element M is defined as the amount of at least one element M by moles with respect to the moles of silica.

Element M is preferably selected from the group consisting of Al and Ga. More preferably, element M is Al. Other elements can be contained in the inventive silica.

The amount of at least one element M in the inventive silica may be at least 0.7 mol %, at least 0.8 mol %, even at least 1.0 mol %. The amount of at least one element M typically does not exceed 25.0 mol %, preferably it does not exceed 20.0 mol %, more preferably it does not exceed 15.0 mol %.

The precipitated silica of the invention is characterised by the presence of acid sites on its surface which are capable of forming bonds with pyridine and which can still be detected by infrared spectroscopy after treatment under vacuum at 25° C. as detailed hereafter.

Thus, the inventive precipitated silica is characterised by an infrared absorption spectrum after chemisorption with pyridine to saturation followed by treatment under vacuum at 25° C. having at least one peak between 1538 and 1559 $cm^{-1}$ and at least one peak between 1612 and 1635 $cm^{-1}$. End values are included in the definition of the ranges in the infrared absorption spectrum.

The expression "at least one peak between X and Y $cm^{-1}$" is used herein to indicate that the maximum of one absorption band is present in the area of the infrared absorption spectrum between X and Y cm-1.

For the avoidance of doubts, the infrared absorption spectrum of the inventive precipitated silica comprises other peaks in addition to the peaks between 1538 and 1559 $cm^{-1}$ and between 1612 and 1635 $cm^{-1}$.

The peaks in the infrared absorption spectrum are determined on a silica sample submitted to the following conditions: treatment under vacuum ($10^{-5}$ Pa) for 1 hour at 25° C.; treatment at 180° C. under vacuum ($10^{-5}$ Pa) for 2 hours; introduction of gaseous pyridine (at 670 Pa) for 5 min at 25° C. to reach saturation; desorption of pyridine at 25° C. under vacuum ($10^{-5}$ Pa) over a period of 30 min.

The presence of a peak around 1541 $cm^{-1}$ has been associated with the formation of protonated pyridinium species, whereas the presence of a peak around 1622 $cm^{-1}$ has been associated with the coordination of pyridine with the silica surface. Both absorption bands are indicative of the presence of specific acid sites on the silica surface.

The area under the peak between 1538 and 1559 $cm^{-1}$ is at least 0.02 $cm^{-1}$. It is typically at least 0.03 $cm^{-1}$, generally at least 0.04 $cm^{-1}$.

The area under the peak between 1612 and 1635 $cm^{-1}$ is at least 0.01 $cm^{-1}$. It is typically at least 0.03 $cm^{-1}$, at least 0.04 $cm^{-1}$, generally at least 0.05 $cm^{-1}$, and even at least 0.10 $cm^{-1}$. In any event the ratio (area under the peak between 1538 and 1559 $cm^{-1}$)/(area under the peak between 1612 and 1635 $cm^{-1}$) is less than 0.80.

The ratio (area under the peak between 1538 and 1559 $cm^{-1}$)/(area under the peak between 1612 and 1635 $cm^{-1}$) can be less than 0.70, even less than 0.65. The ratio (area under the peak between 1538 and 1559 $cm^{-1}$)/(area under the peak between 1612 and 1635 $cm^{-1}$) is at least 0.01, typically at least 0.02, preferably at least 0.04.

The ratio (area under the peak between 1538 and 1559 $cm^{-1}$)/(area under the peak between 1612 and 1635 $cm^{-1}$) is typically between 0.02 and 0.80, preferably between 0.04 and 0.80. The ratio may even be between 0.05 and 0.80.

The inventive silica is further characterised by a BET surface area $S_{BET}$ in the range from 40 to 800 $m^2/g$. The BET surface area $S_{BET}$ is at least 50 $m^2/g$. The BET surface area $S_{BET}$ may be conveniently greater than 60 $m^2/g$. The BET surface area $S_{BET}$ can be less than 700 $m^2/g$, preferably less than 500 $m^2/g$, more preferably less than 450 $m^2/g$.

Advantageously the inventive precipitated silica may have a BET surface area $S_{BET}$ in the range from 50 to 450 $m^2/g$, preferably from 60 to 400 $m^2/g$.

In an advantageous embodiment, the precipitated silica of the invention is characterised by:
- a BET surface area $S_{BET}$ in the range from 40 to 800 $m^2/g$;
- an amount of at least one element M selected from the group consisting of B, Al, Ga and mixtures thereof in the range from 0.5 to 30.0 mol %;
- an infrared absorption spectrum having at least one peak between 1538 and 1559 $cm^{-1}$ and at least one peak between 1612 and 1635 $cm^{-1}$, said spectrum having been measured after chemisorption with pyridine to saturation followed by treatment under vacuum at 25° C., wherein the ratio (area under the peak between 1538 and 1559 $cm^{-1}$)/(area under the peak between 1612 and 1635 $cm^{-1}$) is less than 0.80.

Preferably, the area under the peak between 1538 and 1559 $cm^{-1}$ is at least 0.02 $cm^{-1}$. More preferably the area under the peak between 1538 and 1559 $cm^{-1}$ is at least 0.02 $cm^{-1}$ and the area under the peak between 1612 and 1635 $cm^{-1}$ is at least 0.03 $cm^{-1}$.

In another advantageous embodiment the precipitated silica of the invention is characterised by:
- a BET surface area $S_{BET}$ in the range from 50 to 450 $m^2/g$;
- an amount of at least one element M selected from the group consisting of Al and Ga in the range from 0.7 to 25.0 mol %, 0.8 to 25.0 mol %, even from 1.0 to 25.0 mol %;
- an infrared absorption spectrum having at least one peak between 1538 and 1559 $cm^{-1}$ and at least one peak between 1612 and 1635 $cm^{-1}$, said spectrum having been measured after chemisorption with pyridine to saturation followed by treatment under vacuum at 25° C., wherein the area under the peak between 1538 and 1559 $cm^{-1}$ is at least 0.02 $cm^{-1}$ and the ratio (area under the peak between 1538 and 1559 $cm^{-1}$)/(area under the peak between 1612 and 1635 $cm^{-1}$) is less than 0.70.

Preferably the area under the peak between 1538 and 1559 $cm^{-1}$ is at least 0.03 $cm^{-1}$ and the area under the peak between 1612 and 1635 $cm^{-1}$ is at least 0.03 $cm^{-1}$.

A second object of the invention is a process for preparing the inventive precipitated silica. The process comprises the reaction of a silicate with an acid to produce a suspension of precipitated silica, said reaction comprising at least one step wherein either a silicate or at least one compound of element M is added to the reaction medium while the reaction medium is at a pH in the range from 2.0 to 6.0, preferably from 3.0 to 5.0, and wherein the at least one compound of element M is added to the reaction medium after at least 50% by weight of the total amount of silicate required for the reaction has been added to the reaction medium. The total amount of the at least one compound of element M is added to the reaction medium after at least 50% by weight of the total amount of silicate required for the reaction has been added thereto.

The total amount of silicate to obtain a given final amount of silica can be determined by the person skilled in the art at the beginning of the process according to common general knowledge.

The reaction comprises the addition of silicate and the addition of at least one compound of element M to the reaction medium with the proviso that either the silicate or the at least one compound of element M is added to the reaction medium at a pH from 2.0 to 6.0, preferably from 3.0 to 5.0.

It has been found that an important condition to promote the formation of acidic sites on the surface of the inventive silica is the presence in the process of a step carried out at an acidic pH, namely at a pH from 2.0 to 6.0, preferably from 3.0 to 5.0. On the other hand the distribution of acidic sites, identified by the peaks between 1538 and 1559 $cm^{-1}$ and those between 1612 and 1635 $cm^{-1}$, is influenced by the stage when element M is introduced into the reaction medium.

In an advantageous embodiment of the inventive process, the at least one compound of element M is added to the reaction medium while the pH is in the range from 2.0 to 6.0, preferably from 3.0 to 5.0.

In certain embodiments of the inventive process, the at least one compound of element M is added to the reaction medium when all of the amount of silicate required for the reaction has been added to the reaction medium.

In other embodiments, the at least one compound of element M is added to the reaction medium after 60%, 70%, 80%, 90% by weight of the total amount of silicate required for the reaction has been added to the reaction medium.

The term "silicate" is used herein to refer to one or more than one silicate which can be added during the course of the inventive process. The silicate is selected from the group consisting of the alkali metal silicates. Advantageously, it is selected from the group consisting of sodium and potassium silicate. The silicate may be in any known form, such as metasilicate or disilicate.

In the case where sodium silicate is used, the latter generally has an $SiO_2/Na_2O$ weight ratio of between 2.0 and 4.0, in particular between 2.4 and 3.9, for example between 3.1 and 3.8.

The silicate may have a concentration (expressed in terms of $SiO_2$) of between 3.9 wt % and 25.0 wt %, for example between 5.6 wt % and 23.2 wt %, in particular between 5.6 wt % and 20.7 wt %.

The term "acid" is used herein to refer to one or more than one acid which can be added during the course of the inventive process. Any acid may be used in the process. Use is generally made of a mineral acid, such as sulfuric acid, nitric acid or hydrochloric acid, or of an organic acid, such as acetic acid, formic acid or carbonic acid.

The acid may be metered into the reaction medium in diluted or concentrated form. The same acid at different concentrations may be used in different stages of the process.

In a preferred embodiment of the process sulfuric acid and sodium silicate are used in all the stages of the process.

Element M is selected from the group consisting of B, Al, Ga and mixtures thereof. Element M is preferably selected from the group consisting of Al and Ga. More preferably, element M is Al.

Any compound of element M may be used in the process of the invention provided it is soluble in water. The at least one compound of element M is typically added into the reaction medium in the form of a solution, typically an aqueous solution.

Notable examples of suitable compound include but are not limited to nitrates, chlorides and sulfates.

When element M is Al, suitable compounds are for instance aluminum sulfate, aluminum nitrate and alkali metal aluminates. Preferably, the compound is selected from the group consisting of the alkali metal aluminates, in particular potassium aluminate or, more preferably, sodium aluminate.

The definitions and preferences provided above also apply to the specific embodiments of the process described hereafter.

In a first embodiment, the inventive process comprises the steps of:
(i) providing a starting solution having a pH equal to or greater than 7.0;
(ii) reducing the pH of the reaction medium to a value lower than 7.0 by either simultaneously adding a silicate and an acid or by adding an acid to said starting solution; and
(iii) simultaneously adding to the reaction medium a silicate and an acid, such that the pH of the reaction medium is maintained in the range from 2.0 to 6.0 to obtain a suspension of precipitated silica,
wherein at least one compound of element M is added to the reaction medium during step (ii) and/or (iii) with the proviso that such addition takes place after at least 50% by weight of the total amount of silicate required for the reaction has been added to the reaction medium.

The at least one compound of element M can be added to the reaction medium during step (ii). Alternatively, compound of element M can be added to the reaction medium during step (iii). Still in a further embodiment, compound of element M can be added to the reaction medium during at least part of steps (ii) and (iii).

In all of the embodiments the totality of the at least one compound of metal M is added to the reaction medium after at least 50% by weight of the total silicate required for the reaction has been added thereto.

In step (i) of the first embodiment of the process, a starting solution having a pH of equal to or greater than 7.0 is provided in the reaction vessel. The starting solution is an aqueous solution, that is the solvent is water.

Typically, the starting solution has a pH of between 8.0 and 13.0, especially between 8.0 and 12.0.

The starting solution may be obtained by adding a base, e.g. NaOH, to water so as to obtain a pH value as detailed above.

Alternatively, the starting solution may contain a silicate. In such a case it may be obtained by adding acid to a mixture of water and silicate to obtain a pH equal to or greater than 7.0.

The starting solution may also containing preformed silica particles at a pH equal to or greater than 7.0.

The starting solution of step (i) may comprise one or more electrolyte. Preferably, the starting solution contains an electrolyte. The term "electrolyte" is used herein in its generally accepted meaning, i.e. to identify any ionic or molecular substance which, when in solution, decomposes or dissociates to form ions or charged particles. Mention may be made of salts selected from the group consisting of the salts of alkali metals and alkaline-earth metals. Advantageously, the electrolyte for use in the starting solution is the salt of the metal of the starting silicate and of the acid used in the process. Notable examples are for example sodium chloride in the case of the reaction of a sodium silicate with hydrochloric acid or, preferably, sodium sulfate, in the case of the reaction of a sodium silicate with sulfuric acid. The electrolyte does not contain element M.

Preferably, when sodium sulfate is used as electrolyte in step (i), its concentration in the starting solution is between 8 and 40 g/L, especially between 10 and 35 g/L, for example between 13 and 30 g/L.

In step (ii) the pH of the reaction medium is reduced to a value lower than 7.0 by either simultaneously adding a silicate and an acid or by adding an acid to said starting solution.

In one aspect of the first embodiment, step (ii) comprise a simultaneous addition of an acid and of a silicate to the starting solution to lower the pH of the reaction medium to less than 7.0. The rates of addition of the acid and of the silicate during step (ii) are controlled in such a way that the average pH of the reaction medium is lowered to less than 7.0. The pH of the reaction medium is preferably between 7.0 and 2.0, especially between 6.0 and 2.0.

In such an aspect of the process, step (iii) is a continuation of step (ii) and it may be carried out under the same or different reaction conditions, such as different pH, different rate of addition of reagents.

In a second aspect of said first embodiment, step (ii) of the process comprise an addition of an acid to the starting solution to lower the pH of the reaction medium to less than 7.0, typically to a pH value between 7.0 and 2.0 typically between 6.0 and 2.0.

Step (iii) then comprises a simultaneous addition of an acid and of a silicate to the reaction medium obtained at the end of step (ii). The rates of addition of the acid and of the silicate during step (iii) are controlled in such a way that the average pH of the reaction medium is maintained between 2.0 and 6.0. In certain embodiments of the inventive process the pH is maintained to a constant value during step (iii) or it can vary.

The pH of the reaction medium during stage (ii)/(iii) is preferably maintained between 2.5 and 5.5, especially between 3.0 and 5.0. In certain embodiments of the inventive process the pH is maintained to a constant value during step (iii) or it can vary.

In a second embodiment, the inventive process comprises the steps of:
(i') providing a starting solution having a pH equal to or greater than 7.0;
(ii') reducing the pH of the reaction medium to a value lower than 7.0 by either simultaneously adding a silicate and an acid or by adding an acid to said starting solution; and (iii') simultaneously adding to the reaction medium an acid and at least one compound of element M, such that the pH of the reaction medium is maintained in the range from 2.0 to 6.0 to obtain a suspension of precipitated silica.

Steps (i') and (ii') of the second embodiment of the process are carried out under the same conditions described for steps (i) and (ii) of the first embodiment.

During step (iii') an acid and at least one compound of element M are simultaneously added to the reaction medium in such a way that the pH of the reaction medium is maintained in the range from 2.0 to 6.0, preferably 3.0 to 5.0. No silicate is added to the reaction medium during step (iii'). Typically, all of the silicate required for the reaction has been added at the end of step (ii').

It should be noted that the inventive process may comprise additional steps. For example, one or more maturing steps can be carried out between the different steps as detailed above.

When element M is B or Ga, the process according to the first and second embodiments may additionally comprise:
 a step (iv) carried out after step (iii) or (iii') which comprises stopping the addition of the acid and raising the pH of the reaction medium to a value from 7.0 to 10.0;
 a step (v) following step (iv) which comprises the simultaneous addition of an acid and of a silicate to the reaction medium in such a manner that the pH of the reaction medium is between 7.5 and 9.5; and
 a step (vi) comprising stopping the addition of the silicate while continuing the addition of the acid to the reaction medium to reach a pH of the reaction medium of less than 6.0 to obtain a suspension of precipitated silica.

The pH of the reaction medium during step (iv) may be increased either by addition of a base, e.g. NaOH, or of a silicate.

When element M is B or Ga, the process according to the first embodiment may thus comprise the following steps as above detailed: (i), (ii), (iii), (iv), (v) and (vi) wherein at least one compound of B or Ga is added to the reaction medium during at least one of steps (ii), (iii) and (iv) with the proviso that the totality of at least one compound of B or Ga is added after at least 50% by weight of the total amount of silicate required for the reaction has been added to the reaction medium.

Regardless of the stage of addition of the compound of element M, the cumulative amount of said compound metered into the reaction medium is such that the amount of M in the precipitated silica is between 0.5 to 30.0 mol %, even between 0.7 to 25.0 mol %. The rates of addition of compound of element M can be adapted to obtain the desired content of M in the precipitated silica by means known to the person skilled in the art.

The reaction vessel in which the reaction of the silicate with the acid is performed is usually equipped with adequate stirring and heating equipment.

The entire reaction of the silicate with the acid is generally performed at a temperature of between 40 and 96° C., in particular between 80 and 95° C.

According to one variant of the invention, the entire reaction of the silicate with the acid is performed at a constant temperature, usually of between 40 and 96° C., in particular between 80 and 95° C.

According to another variant of the invention, the temperature at the end of the reaction is higher than the temperature at the start of the reaction: thus, the temperature at the start of the reaction is preferably maintained at between 40 and 80° C. and the temperature is then increased, preferably up to a value of between 80 and 96° C., at which value it is maintained up to the end of the reaction.

At the end of the steps that have just been described, a suspension of precipitated silica is obtained, which is subsequently separated (liquid/solid separation). The process in all of its embodiments, thus typically comprises a further step of filtering the suspension of precipitated silica and drying the precipitated silica.

The separation usually comprises a filtration, followed by washing, if necessary. The filtration is performed according to any known method, for example by means of a belt filter, a rotary filter, for example a vacuum filter, or, preferably a filter press.

The filter cake is then subjected to a liquefaction operation. The term "liquefaction" is intended herein to indicate a process wherein a solid, namely the filter cake, is converted into a fluid-like mass. After the liquefaction step the filter cake is in a flowable, fluid-like form and the precipitated silica is in suspension.

The liquefaction step may comprise a mechanical treatment which results in a reduction of the granulometry of the silica in suspension. Said mechanical treatment may be carried out by passing the filter cake through a high shear mixer, a colloidal-type mill or a ball mill. Optionally, the liquefaction step may be carried out by subjecting the filter cake to a chemical action, for instance by addition of water or an acid. The mechanical and chemical treatments may be both carried out. The suspension of precipitated silica which is obtained after the liquefaction step is subsequently dried.

Drying may be performed according to means known in the art. Preferably, the drying is performed by atomization. To this end, use may be made of any type of suitable atomizer, in particular a turbine, nozzle, liquid pressure or two-fluid spray-dryer. In general, when the filtration is performed using a filter press, a nozzle spray-dryer is used, and when the filtration is performed using a vacuum filter, a turbine spray-dryer is used.

When the drying operation is performed using a nozzle spray-dryer, the precipitated silica that may then be obtained is usually in the form of substantially spherical beads. After this drying operation, it is optionally possible to perform a step of milling or micronizing on the recovered product; the precipitated silica that may then be obtained is generally in the form of a powder.

When the drying operation is performed using a turbine spray-dryer, the precipitated silica that may then be obtained may be in the form of a powder.

Finally, the dried, milled or micronized product as indicated previously may optionally be subjected to an agglomeration step, which consists, for example, of direct compression, wet granulation (i.e. with use of a binder, such as water, silica suspension, etc.), extrusion or, preferably, dry compacting.

The precipitated silica that may then be obtained via this agglomeration step is generally in the form of granules.

The inventive precipitated silica can be used in a number of applications, such as catalyst, catalyst support, absorbent for active materials (in particular support for liquids, especially used in food, such as vitamins (vitamin E or choline chloride), as viscosity modifier, texturizing or anticaking agent, or as additive for toothpaste, concrete or paper. The inventive silica may also conveniently be used in the manufacture of thermally insulating materials or in the preparation of resorcinol-formaldehyde/silica composites The inventive precipitated silica finds a particularly advantageous application as filler in polymeric compositions. The at least one polymer can be selected among the thermosetting polymers and the thermoplastic polymers. Notable, non-limiting examples of thermosetting polymers include thermosetting resins such as epoxy resins, unsaturated polyester resins, vinyl ester resins, phenolic resins, epoxy acrylate resins, urethane acrylate resins, phenoxy resins, alkyd resins, urethane resins, maleimide resins, and cyanate resins.

Notable, non-limiting examples of suitable thermoplastic polymers include styrene-based polymers such as polystyrene, (meth)acrylic acid ester/styrene copolymers, acrylonitrile/styrene copolymers, styrene/maleic anhydride copolymers, ABS; acrylic polymers such as polymethylmethacrylate; polycarbonates; polyamides; polyesters, such as polyethylene terephthalate and polybutylene terephthalate; polyphenylene ethers; polysulfones; polyaryletherketones; polyphenylene sulfides; thermoplastic polyurethanes; polyolefins such as polyethylene, polypropylene, polybutene, poly-4-methylpentene, ethylene/propylene copolymers, ethylene/α-olefins copolymers; copolymers of α-olefins and various monomers, such as ethylene/vinyl acetate copolymers, ethylene/(meth)acrylic acid ester copolymers, ethylene/maleic anhydride copolymers, ethylene/acrylic acid copolymers; aliphatic polyesters such as polylactic acid, polycaprolactone, and aliphatic glycol/aliphatic dicarboxylic acid copolymers.

The inventive silica may advantageously be employed as reinforcing filler in elastomeric compositions. Accordingly a preferred object of the invention is a composition comprising the inventive silica and one or more elastomers, preferably exhibiting at least one glass transition temperature between −150° C. and +300° C., for example between −150° C. and +20° C.

Notable non-limiting examples of suitable elastomers are diene elastomers. For example, use may be made of elastomers deriving from aliphatic or aromatic monomers, comprising at least one unsaturation such as, in particular, ethylene, propylene, butadiene, isoprene, styrene, acrylonitrile, isobutylene or vinyl acetate, polybutyl acrylate, or their mixtures. Mention may also be made of functionalized elastomers, that is elastomers functionalized by chemical groups positioned along the macromolecular chain and/or at one or more of its ends (for example by functional groups capable of reacting with the surface of the silica), and halogenated polymers. Mention may be made of polyamides, ethylene homo- and copolymer, propylene homo- and copolymer.

Among diene elastomers mention may be made, for example, of polybutadienes (BRs), polyisoprenes (IRs), butadiene copolymers, isoprene copolymers, or their mixtures, and in particular styrene/butadiene copolymers (SBRs, in particular ESBRs (emulsion) or SSBRs (solution)), isoprene/butadiene copolymers (BIRs), isoprene/styrene copolymers (SIRs), isoprene/butadiene/styrene copolymers (SBIRs), ethylene/propylene/diene terpolymers (EPDMs), and also the associated functionalized polymers (exhibiting, for example, pendant polar groups or polar groups at the chain end, which can interact with the silica).

Mention may also be made of natural rubber (NR) and epoxidized natural rubber (ENR).

The polymer compositions can be vulcanized with sulfur or crosslinked, in particular with peroxides or other crosslinking systems (for example diamines or phenolic resins).

In general, the polymer compositions additionally comprise at least one (silica/polymer) coupling agent and/or at least one covering agent; they can also comprise, inter alia, an antioxidant.

Notable, non-limiting examples of suitable coupling agents are for instance "symmetrical" or "unsymmetrical" silane polysulfides; mention may more particularly be made of bis((C1-C4)alkoxyl(C1-C4)alkylsilyl(C1-C4)alkyl) polysulfides (in particular disulfides, trisulfides or tetrasulfides), such as, for example, bis(3-(trimethoxysilyl)propyl) polysulfides or bis(3-(triethoxysilyl)propyl) polysulfides, such as triethoxysilylpropyl tetrasulfide. Mention may also be made of monoethoxydimethylsilylpropyl tetrasulfide. Mention may also be made of silanes comprising masked or free thiol functional groups.

The coupling agent can be grafted beforehand to the polymer. It can also be employed in the free state (that is to say, not grafted beforehand) or grafted at the surface of the silica. It is the same for the optional covering agent.

The coupling agent can optionally be combined with an appropriate "coupling activator", that is to say a compound which, mixed with this coupling agent, increases the effectiveness of the latter.

The proportion by weight of the inventive silica in the polymer composition can vary within a fairly wide range. It normally represents from 10% to 200%, in particular from 20% to 150%, especially from 20% to 80% (for example from 30% to 70%) or from 80% to 120% (for example from 90% to 110%), of the amount of the polymer(s).

The silica according to the invention can advantageously constitute all of the reinforcing inorganic filler and even all of the reinforcing filler of the polymer composition.

The compositions comprising the precipitated silica of the invention may be used for the manufacture of a number of articles. Non-limiting examples of finished articles comprising at least one of the polymer compositions described above, are for instance of footwear soles, floor coverings, gas barriers, flame-retardant materials and also engineering components, such as rollers for cableways, seals for domestic electrical appliances, seals for liquid or gas pipes, braking system seals, pipes (flexible), sheathings (in particular cable sheathings), cables, engine supports, tires, battery separators, conveyor belts, or transmission belts.

Should the disclosure of any patents, patent applications, and publications which are incorporated herein by reference conflict with the description of the present application to the extent that it may render a term unclear, the present description shall take precedence.

Analytical Methods

The physicochemical properties of the precipitated silica of the invention were determined using the methods described hereafter.

BET Surface Area

BET surface area was determined according to the Brunauer-Emmett-Teller method as detailed in standard NF ISO 5794-1, Appendix E (June 2010) with the following adjustments: the sample was pre-dried at 160° C.±10° C., the partial pressure (P/P°) used for the measurement was between 0.05 and 0.20.

CTAB Surface Area

The CTAB surface area was determined according to standard NF ISO 5794-1, Appendix G (June 2010).

Determination of Content of Element M

The content of element M was determined by means of ICP OES (inductively coupled plasma optical emission spectrometry) after digestion of the sample in fluorhydric acid (eg. 0.2-0.3 g of $SiO_2$ with 1 mL of fluorhydric acid 40%). The limpid solution was diluted in a 5% nitric acid aqueous solution according to the expected concentration of element M (eg. dilution by a factor of 1500 for an amount of 0.3%). The intensity measured at the specific wavelength of element M (e.g. 396.152 nm for Al; 249.773 nm for B and 233.527 nm for Ga) was compared to a calibration curve in the range of 0.05 to 2.00 mg/L of standards obtained in similar analytical conditions. The amount in the solid was obtained by calculation using the dilution factor and the dry extract of the silica measured.

Determination of Residual Sulfates in Silica

Sulfate was determined by measuring the sulfur in silica by ICP OES (inductively coupled plasma optical emission spectrometry) after digestion of the sample in fluorhydric acid (eg. 0.2-0.3 g of silica with 1 mL of fluorhydric acid 40%). The limpid solution was diluted in a nitric acid 5% aqueous solution according to the expected sulfur concentration (eg. dilution by a factor of 1500 for an amount of 0.5% $SO_4$). The intensity measured on the sulfur specific wavelength (e.g. 180.672 and 181.975 nm) was compared to a calibration curve in the range of 0.05 to 2.00 mg/L of sulfur standards obtained in similar analytical conditions in order to measure the amount in the diluted solution. The amount of sulfate in the solid is obtained by calculation using the molecular weight ratio between sulfur and sulfate, the dilution factor and the dry extract of the silica.

Infrared Spectroscopy

The analysis is performed on silica samples having a $Na_2SO_4$ content between 0.2 and 0.6% by weight and an amount of other anions (such as $Cl^-$, $Br^-$, $I^-$, $NO_3^-$, $PO_4^{3-}$) not exceeding 0.015% by weight for each individual anion. Samples containing higher amounts of $Na_2SO_4$ should be washed with water to reduce the amount of salt to the level 0.2-0.6% by weight. Samples containing other salt, e.g. chlorides, nitrites etc., in amounts greater than 0.015% by weight (measured on the anion) should be washed to reduce the content of the residual anion to below 0.015% by weight and $Na_2SO_4$ should be added to obtain a value of between 0.2 and 0.6% by weight. An appropriate quantity of $Na_2SO_4$ should be added to the washing water in order to obtain a value of between 0.2 and 0.6% by weight after drying. Pure products should be suspended in aqueous solution of $Na_2SO_4$ with the appropriate concentration in order to obtain a value of between 0.2 and 0.6% by weight after drying.

Equipment and sample preparation: The surface infrared analysis (by absorbance) was carried out on a Bruker Equinox 55 FTIR spectrometer on a pellet of pure product. The pellet was obtained after grinding the silica as is in an agate mortar and pelleting at 2 T/cm$^2$ for 10 seconds. The diameter of the pellet is generally 17 mm. The weight of the pellet was between 10 and 20 mg.

Spectra Acquisition

The pellet was placed in the high vacuum chamber ($10^{-5}$ Pa) of the spectrometer. Acquisition took place under high vacuum (acquisition conditions: from 400 cm$^{-1}$ to 6000 cm$^{-1}$; number of scans: 100; resolution: 2 cm$^{-1}$). A background spectrum was recorded, a spectrum was recorded after each step 1 to 5 performed at the temperature and pressure conditions as described hereafter:

1. 25° C. at atmospheric pressure;
2. 25° C. under vacuum ($10^{-5}$ Pa) for 1 hour (desorption of the residual water);
3. 180° C. under vacuum ($10^{-5}$ Pa) for 2 hours.
4. Introduction of gaseous pyridine (670 Pa) for 5 min at 25° C. to reach saturation;
5. desorption of pyridine at 25° C. under vacuum ($10^{-5}$ Pa) over a period of 30 min.

The spectra were standardized using the instrument software OPUS version 7.2 supplied by Bruker Optik GmbH as follows: baseline correction; the $SiO_2$ fingerprint peak at 1870 cm$^{-1}$ was scaled to 0.2 absorbance units (to normalise the spectra of different samples to the same mass of $SiO_2$).

Determination of the Area Under the Peaks Between 1538 and 1559 cm$^{-1}$ and Between 1635 and 1612 cm$^{-1}$ The range in the infrared spectrum taken into consideration was from 1700 cm$^{-1}$ to 1400 cm$^{-1}$.

The determination of the area under the peaks in the identified regions of the IR spectrum was performed on the spectrum obtained at the end of step 5, as detailed above, using the integration function of the software OPUS version 7.2 supplied by Bruker Optik GmbH as follows: in the menu "set-up integration" the integration method B was selected and the integral calculated between the values of 1538 and 1559 cm$^{-1}$ and of 1612 and 1635 cm$^{-1}$ respectively. The value obtained by the software was recorded.

The calculation of the integral under the peak between 1538 and 1559 cm$^{-1}$ is outlined: the points on the infrared absorption curve corresponding to values 1538 cm$^{-1}$ and 1559 cm$^{-1}$ are identified and they are connected by a straight line passing through both points. The area underlying the absorption spectrum and comprised between said straight line and the absorption spectrum between 1538 cm$^{-1}$ and at 1559 cm$^{-1}$ is taken as the area under the peak.

EXAMPLES

Example 1

An aqueous suspension of silica was prepared following the procedure described in Example 1 of EP 520862A1 from the initial stage until the isolation of a filter cake, by introducing 2160 g of said filter cake (dry extract equal to 24.09%) in 3041 g of deionised water.

The silica suspension, was put under agitation in a 5 L reactor, then the temperature adjusted to 60° C. The pH of the suspension was adjusted to 3.5 by adding sulfuric acid (concentration=7.7 wt %).

204 g of a solution of aluminum sulfate $Al_2(SO_4)_3$ dissolved in water at a concentration of 22.4 g/L aluminum were added to the suspension. The pH of the reaction medium was maintained at the value of 4.5 throughout the addition of the aluminium sulfate solution (using a solution of sodium hydroxyde NaOH 1 M). The reaction medium was left to mature for 300 s. The resulting slurry was dried by means of a NIRO atomizer to obtain precipitated silica S1. The isolated product was washed with deionised water to bring the amount of residual $Na_2SO_4$ in the range from 0.2 to 0.6 wt % and then re-dried.

The properties precipitated silica S1 are reported in Table I.

TABLE I

| | BET ($m^2/g$) | CTAB ($m^2/g$) | Al (mol %) | Area of peak between 1538 and 1559 $cm^{-1}$ | Area of peak between 1612 and 1635 $cm^{-1}$ | (Area of peak between 1538 and 1559 $cm^{-1}$)/ (Area of peak between 1612 and 1635 $cm^{-1}$) |
|---|---|---|---|---|---|---|
| S1 | 132 | 154 | 0.9 | 0.06 | 0.80 | 0.07 |
| CS1 | 217 | 214 | 1.0 | — | 0.50 | — |

Comparative Example 1

Example 3 of WO96/30304 was reproduced essentially as described. The properties of precipitated silica CS1 are reported in Table I. The addition of an aluminium compound at pH of 7.7, as in Comparative Example 1, provides a precipitated silica without any peak in the 1538-1559 $cm^{-1}$ region.

Comparative Example 2

Example 1 of EP 520862A1 was reproduced essentially as described, with the addition of an aluminium compound at a pH>6.0. Precipitated silica CS2 is characterized by the absence of any peak in the 1538-1559 $cm^{-1}$ region and hence a ratio (Area of peak between 1538 and 1559 $cm^{-1}$)/(Area of peak between 1612 and 1635 $cm^{-1}$) equal to zero. The Al content of precipitated silica CS2 is 0.7 mol % and the CTAB surface area is 154 $m^2/g$.

Examples 2 and 3—Comparative Examples 3 and 4

Elastomeric compositions were prepared using inventive silica S1 in comparison with silica CS2. The compositions, expressed as parts by weight per 100 parts of elastomers (phr), are described in Table II below:

TABLE II

| Composition | Example 2 | Example 3 | Comp. Ex. 3 | Comp. Ex. 4 |
|---|---|---|---|---|
| sSBR | 110 | | 110 | |
| f-sSBR | | 80 | | 80 |
| BR | 20 | 20 | 20 | 20 |
| Silica S1 | 80 | 80 | | |
| Silica CS2 | | | 80 | 80 |
| Carbon black (N330) | 3.0 | 3.0 | 3.0 | 3.0 |
| TESPD | 5.6 | 5.6 | 5.6 | 5.6 |
| Stearic acid | 2.0 | 2.0 | 2.0 | 2.0 |
| TDAE oil | 5.0 | 35.0 | 5.0 | 35.0 |
| ZnO | 2.5 | 2.5 | 2.5 | 2.5 |
| 6-PPD | 1.9 | 1.9 | 1.9 | 1.9 |
| Sulfur | 1.7 | 1.7 | 1.7 | 1.7 |
| CBS | 2.0 | 2.0 | 2.0 | 2.0 |
| DPG | 1.5 | 1.5 | 1.5 | 1.5 | sSBR: Oil extended solution SBR, Buna VSL4526-2HM from Lanxess with 45% of vinyl units; 26% of styrene units; Tg of −30° C., 37.5 phr of TDAE
F-sSBR: Functionalized solution SBR SPRINTAN ® SLR-4602 from Trinseo with 62% of vinyl units; 21% of styrene units, Tg of −25%
BR: Butyl Rubber Buna CB 25 from Lanxess
TESPD: Bis[3-(triethoxysilyl)propyl]disulfide, Xiameter Z-6920 from Dow Corning
TDAE oil, Vivatec 500 from Hansen & Rosenthal KG
6-PPD: N-(1,3-Dimethylbutyl)-N-phenyl-para-phenylenediamine, Santoflex 6-PPD from Flexsys
CBS: N-Cyclohexyl-2-benzothiazolesulfenamide, Rhenogran CBS-80 from RheinChemie
DPG: Diphenylguanidine, Rhenogran DPG-80 from RheinChemie The process for the preparation of the rubber compositions was carried out in two successive preparation phases: a first phase of high-temperature thermomechanical working, followed by a second phase of mechanical working at temperatures of less than 110° C. to introduce the vulcanization system.

The first phase was carried out using a mixing device, of internal mixer type, of Brabender brand (capacity of 70 mL). The initial temperature and the speed of the rotors were set so as to achieve mixture dropping temperatures between 130° C. and 160° C.

In a first pass of the first phase the elastomers and the reinforcing filler (introduction in instalments) were mixed with the coupling agent, the oil and the stearic acid. The duration was between 5 and 8 minutes.

After cooling the mixture (temperature of less than 100° C.), a second pass made it possible to incorporate the zinc oxide and the protecting agents/antioxidants. The duration of this pass was between 2 and 5 minutes.

After cooling the mixture (temperature of less than 100° C.), the vulcanization system were added during the second phase. It was carried out on an open mill, preheated to 50° C. The duration of this phase was between 2 and 6 minutes.

Each final mixture was subsequently calendered in the form of plaques with a thickness of 2-3 mm.

Properties of the Vulcanisates

The measurements were carried out after vulcanization at 160° C. Uniaxial tensile tests were carried out in accordance with the instructions of the standard NF ISO 37 with test specimens of H2 type at a rate of 500 mm/min on an Instron 5564 device. The 300% modulus, corresponding to the stress measured at 300% of tensile strain, are and the tensile strength are expressed in MPa; elongation at break is expressed in MPa and energy at break in Joules.

The Z value was measured, after crosslinking, according to the method described by S. Otto and al. in Kautschuk Gummi Kunststoffe, 58 Jahrgang, NR 7-8/2005 in accordance with ISO 11345.

The percentage "area not dispersed" is calculated using a camera observing the surface of the sample in a 30° incident light. The bright points are associated with the charge and the agglomerates, while dark points are associated with the rubber matrix. A digital processing transforms the image into a black and white image, and allows the determination of the percentage "area not dispersed", as described by S. Otto in the document cited above. The more the Z score is high, the better dispersion of the charge in the elastomeric matrix (a Z score of 100 corresponding to a dispersion perfect and a Z score of 0 has a dispersion mediocre).

The calculation of the Z value is based on the percentage area in which the charge is not dispersed as measured by the machine DisperGrader® 1000 supplied with its operative mode and its operating software DisperData by the company Dynisco according to equation: Z=100−(percent area not dispersed)/0.35

The values for the loss factor (tan δ) and amplitude of elastic modulus in dynamic shear (ΔG') were recorded on vulcanized samples (parallelepiped specimen: cross section 8 mm² and height 7 mm). The sample is subjected to a double alternating sinusoidal shear strain at a temperature of 40° C. and at a frequency of 10 Hz. The strain amplitude sweeping processes were performed according to an outward-return cycle, proceeding outward from 0.1% to 50% and then returning from 50% to 0.1%. The values reported in Table III are obtained from the return strain amplitude scanning and concern the maximum value of the loss factor (tan δ max) and the amplitude of the elastic modulus (ΔG') between the values at 0.1% and 50% of strain (Payne effect).

TABLE III

|  | Example 2 | Example 3 | Comp. Ex. 3 | Comp. Ex. 4 |
|---|---|---|---|---|
| Z index | 91 | 90 | 96 | 85 |
| Modulus 300% (MPa) | 10.0 | 10.3 | 11.8 | 10.3 |
| Tensile strength (MPa) | 18.5 | 16.8 | 18.5 | 17.5 |
| Elongation at break (%) | 468 | 422 | 416 | 430 |
| Energy at break (J) | 2.9 | 2.3 | 2.6 | 2.4 |
| ΔG' (MPa) | 1.3 | 0.7 | 2.3 | 1.9 |
| Tan δ max | 0.191 | 0.137 | 0.223 | 0.194 |

The silica according to the invention is highly dispersible silica that allows a reduction of energy dissipation at 40° C. (lower ΔG' and tan δ max) without negative impact on reinforcement.

The invention claimed is:

1. A precipitated silica comprising silica and
   at least one element M selected from the group consisting of B, Al, Ga and mixtures thereof in an amount in a range from 0.5 to 30.0 mol % with respect to moles of the precipitated silica;
   wherein the precipitated silica exhibits an infrared absorption spectrum having at least one peak between 1538 and 1559 $cm^{-1}$ and one peak between 1612 and 1635 $cm^{-1}$, said infrared absorption spectrum having been measured after chemisorption with pyridine to saturation followed by treatment under vacuum at 25° C., wherein an area under the at least one peak between 1538 and 1559 $cm^{-1}$ is at least 0.04 $cm^{-1}$, the area under the one peak between 1612 and 1635 $cm^{-1}$ is at least 0.05 $cm^{-1}$, and a ratio (area under the at least one peak between 1538 and 1559 $cm^{-1}$)/(area under the one peak between 1612 and 1635 $cm^{-1}$) is less than 0.80.

2. The precipitated silica of claim 1, wherein the at least one element M is selected from the group consisting of Al and Ga.

3. The precipitated silica of claim 1, wherein the amount of the at least one element M is in the range from 0.7 to 25.0 mol % with respect to moles of the precipitated silica.

4. The precipitated silica of claim 3 wherein the amount of the at least one element M is in the range from 0.8 to 25.0 mol % with respect to moles of the precipitated silica.

5. The precipitated silica of claim 1, characterized by a BET surface area $S_{BET}$ from 40 to 800 m²/g.

6. The precipitated silica of claim 5 characterized by the BET surface area $S_{BET}$ from 50 to 450 m²/g.

7. A composition comprising the precipitated silica of claim 1 and at least one polymer.

8. The composition of claim 7 wherein the at least one polymer is an elastomer.

9. An article comprising the composition of claim 7.

10. The article of claim 9 in the form of a footwear sole, floor covering, gas barrier, roller for cableways, seal for domestic electrical appliances, seal for liquid or gas pipes, braking system seal, pipe, sheathing, cable, engine support, battery separator, conveyor belt, or transmission belt.

11. A catalyst, catalyst support, thermal insulation material, resorcinol-formaldehyde/silica composite, absorbent for active materials, additive for toothpaste, concrete or paper comprising the precipitated silica of claim 1.

* * * * *